(12) United States Patent
Suda et al.

(10) Patent No.: US 7,381,759 B2
(45) Date of Patent: *Jun. 3, 2008

(54) POLYMER COMPOSITION, IMAGE-FORMING METHOD AND IMAGE-FORMING APPARATUS

(75) Inventors: Sakae Suda, Kanagawa (JP); Koichi Sato, Kanagawa (JP); Ikuo Nakazawa, Kanagawa (JP); Masayuki Ikegami, Kanagawa (JP)

(73) Assignee: Canon Kabushiki Kaisha, Shimomaruko, Ohta-ku, Tokyo (JP)

( * ) Notice: Subject to any disclaimer, the term of this patent is extended or adjusted under 35 U.S.C. 154(b) by 180 days.

This patent is subject to a terminal disclaimer.

(21) Appl. No.: 10/613,589

(22) Filed: Jul. 2, 2003

(65) Prior Publication Data

US 2004/0024090 A1    Feb. 5, 2004

(30) Foreign Application Priority Data

Jul. 3, 2002    (JP) .............................. 2002-195119

(51) Int. Cl.
C09D 11/00    (2006.01)

(52) U.S. Cl. ...................... 523/160; 523/161; 524/505; 524/612; 526/320; 526/326; 526/333; 526/334

(58) Field of Classification Search ................ 523/160, 523/161; 524/505, 612; 526/320, 326, 333, 526/334
See application file for complete search history.

(56) References Cited

U.S. PATENT DOCUMENTS

| | | | |
|---|---|---|---|
| 3,062,892 | A | 11/1962 | Schneider |
| 4,313,124 | A | 1/1982 | Hara |
| 4,345,262 | A | 8/1982 | Shirato et al. |
| 4,459,600 | A | 7/1984 | Sato et al. |
| 4,463,359 | A | 7/1984 | Ayata et al. |
| 4,558,333 | A | 12/1985 | Sugitani et al. |
| 4,723,129 | A | 2/1988 | Endo et al. |
| 4,740,796 | A | 4/1988 | Endo et al. |
| 4,892,902 | A * | 1/1990 | Shioji et al. ................. 524/417 |
| 5,085,698 | A | 2/1992 | Ma et al. |
| 5,139,574 | A | 8/1992 | Winnik et al. |
| 5,198,319 | A | 3/1993 | Kato |
| 5,283,148 | A * | 2/1994 | Rao ............................ 430/114 |
| 5,399,631 | A | 3/1995 | Egawa et al. |
| 5,585,427 | A * | 12/1996 | Schimmel et al. .......... 524/377 |
| 5,990,202 | A * | 11/1999 | Nguyen et al. ............. 523/201 |
| 6,033,466 | A | 3/2000 | Ito |
| 6,313,066 | B1 | 11/2001 | Takayama |
| 6,375,742 | B2 | 4/2002 | Sano et al. |
| 6,380,315 | B1 | 4/2002 | Fischer et al. |
| 6,391,923 | B1* | 5/2002 | Pollmann et al. ........... 514/714 |
| 6,491,903 | B1* | 12/2002 | Forster et al. ........... 424/78.01 |
| 6,616,946 | B1 | 9/2003 | Meier et al. |
| 6,875,798 | B2 | 4/2005 | Yui et al. |
| 2003/0050364 | A1* | 3/2003 | Sato et al. ................... 523/160 |
| 2003/0153649 | A1 | 8/2003 | Bromberg |
| 2003/0232903 | A1* | 12/2003 | Sato et al. ................... 523/160 |
| 2003/0232904 | A1* | 12/2003 | Sato et al. ................... 523/160 |
| 2003/0236343 | A1* | 12/2003 | Sato et al. ................... 524/539 |

FOREIGN PATENT DOCUMENTS

| | | |
|---|---|---|
| EP | 1 243 624 | 9/2002 |
| EP | 1 285 948 | 2/2003 |
| EP | 1 422 255 | 5/2004 |
| JP | 59-123670 | 7/1984 |
| JP | 59-138461 | 8/1984 |
| JP | 09157563 A * | 6/1997 |
| JP | 11-080211 | 3/1999 |
| JP | 11-322866 | 11/1999 |
| JP | 11/322942 | 11/1999 |
| WO | 02/100918 | 12/2002 |

OTHER PUBLICATIONS

Machine Translation of JP 09-157563 A (1997).*
Morrison, Robert Thorton and Boyd, Robert Neilson; Organic Chemistry 5th Edition; Allyn and Bacon Inc. Boston, 1987 (p. 700).
Laus, Michele, Bignozzi, Maria Chiara, Fagnani, Marco and Angeloni, Annino Sante; "Liquid Crystalline Poly(vinyl ether)s and Block Copoly(vinyl ether)s by Living Cationic Polymerization", Macromolecules, vol. 29(15), 1996 (pp. 5111-5118).
Takeuchi et al. "Living Cationic Polymerization of Ethyl 2-(Vinyloxy) Ethoxyacetate: A Vinyl Ether with an Ether and an Ester function in the pendant" Journal of Polymer Science, Polymer Chemistry Edition, John Wiley and Sons. New York, US, vol. 27, No. 10, Sep. 1, 1989 pp. 3303-3314.
Rahman et al. "Cationic Polymerization of Vinyl Ether with a Benzoate Pendant: The formation of long lived polymers and the identification of side reactions" J Polymer Science Part A; Journal of Polymer Science, Part A: Polymer Chemistry Dec. 2000 John Wiley & Sons Inc. New York, NY US vol. 38, No. 24, Dec. 2000 pp. 4362-4372.
Hashimoto, et al. "Cationinc Polymerization of Vinyl Ethers with a Benzoate or Phenylacetate Pendant: Synthesis of New Poly (Carbozylic Acid)s with Poly (Vinyl Ether) Backbone" Journal of Macromolecular Science Pure and Applied Chemistry, A 36(3), pp. 449-460 (1999).

* cited by examiner

*Primary Examiner*—Bernard Lipman
(74) *Attorney, Agent, or Firm*—Morgan & Finnegan, L.L.P.

(57) ABSTRACT

A dispersible composition that comprises a polymer compound, a functional substance such as a colorant, and a solvent or a dispersion medium, where the polymer compound is comprised of a monomer unit represented by the general formula (1)

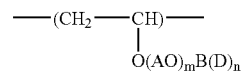

wherein A is a straight-chain or branched alkylene group of 1 to 15 carbon atoms with or without substitution; m is an integer of 0 to 30, and when m is 2 or more, A is the same or different each other; B is a single bond or an alkylene with or without substitution; D is a substituted or unsubstituted aromatic ring structure; n is an integer of 1 to 10, and when n is 2 or more, D is the same or different with each other. The composition is usable as an ink composition or toner composition.

7 Claims, 1 Drawing Sheet

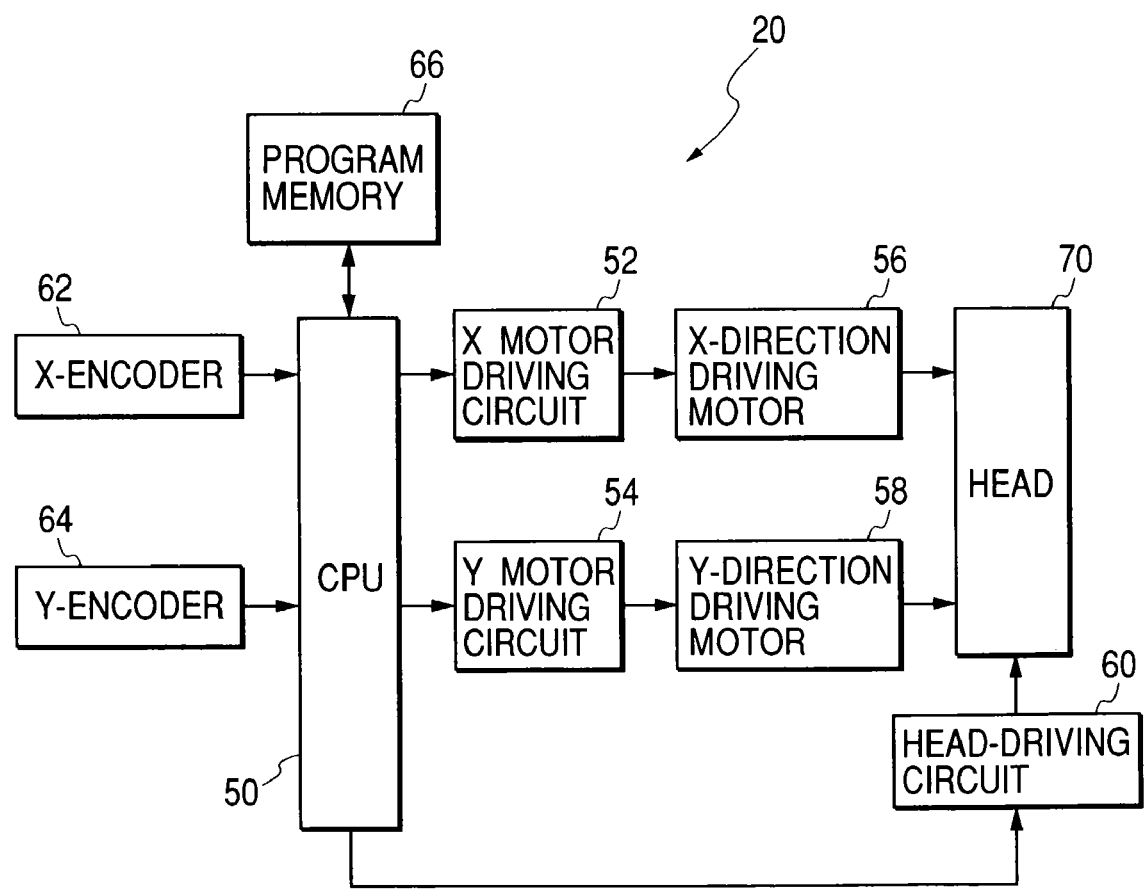
FIGURE

POLYMER COMPOSITION, IMAGE-FORMING METHOD AND IMAGE-FORMING APPARATUS

BACKGROUND OF THE INVENTION

1. Field of the Invention

The present invention relates to compositions of novel polymer compounds useful as various functional materials, image-forming methods and image-forming apparatuses using the same. More specifically, the present invention relates to ink compositions, toner compositions prepared using a novel polymer compound, a colorant and a solvent or dispersion medium, and to various image-forming methods and apparatuses using such compositions.

2. Related Background Art

Materials containing a functional substance and dispersible in water are well-known. For example, there are agricultural chemicals such as herbicides and insecticides, medicines such as anticancer agents, anti-allergic agents and anti-inflammation agents, and coloring materials such as inks and toners containing a colorant.

Meanwhile, digital printing technology has been making a rapid progress in recent years. Digital printing technology represented by electrophotography and ink jet technology are now widely used in office and home.

Ink jet technology is a direct recording method, and characterized in compact size and low electric consumption. In addition, improvement of image quality is now under rapid progress by using finer nozzles. One of the ink jet recording systems is the bubble jet system where an ink droplet is ejected to form an image on a recording medium by the action of a bubble formed by heating the ink supplied from the ink tank using a heater provided in the head. Another system is the piezoelectric system which ejects ink from the nozzle by the vibration action of a piezoelectric element.

Since inks used for there systems are usually water solutions of dyes, bleeding may occur when colors are superimposed, or feathering may be observed at the recorded portion along the direction of the paper fibers of the recording medium. Use of pigment ink has been proposed to overcome the above problems (U.S. Pat. No. 5,085,698). Still much more improvement is required.

SUMMARY OF THE INVENTION

The present invention provides a polymer compound composition having excellent dispersion ability for functional substances such as a colorant and solid matter for ink and toner compositions.

According to the first aspect of the present invention, there is provided a composition that comprises a polymer compound containing a monomer unit the following general formula (1), a functional substance, and a medium being a solvent or a binder resin, (General Formula 1)

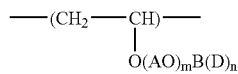

wherein A is a straight-chain or branched alkylene group of 1 to 15 carbon atoms with or without substitution; m is an integer of 0 to 30, and when m is 2 or more, A is the same or different each other; B is a single bond or an alkylene with or without substitution; D is a substituted or unsubstituted aromatic ring structure; n is an integer of 1 to 10, and when n is 2 or more, D is the same or different with each other.

A preferable embodiment of the invention is a composition encapsulating the functional substance in the polymer compound, wherein the functional substance is a colorant.

More preferable embodiments of the invention are a toner composition that comprises a dispersion medium, a colorant and a polymer made of a monomer unit represented by the general formula (1), and an ink composition that comprises a solvent, a colorant and a polymer made of a monomer unit represented by the general formula (1).

The second aspect of the present invention is a method for forming images using one of the above-described compositions. A preferred embodiment is a method where the above ink composition is ejected onto a recording medium to form an image.

The third aspect of the present invention is an image forming apparatus to form an image on a recording medium by the above image forming method.

The fourth aspect of the present invention is a block polymer having a monomer unit structure represented by the general formula (1), and having at least one residue selected from carboxylic acid ester, carboxylic acid, and carboxylic acid salt.

BRIEF DESCRIPTION OF THE DRAWING

FIGURE is a block diagram illustrating a structure of an ink-jet recording apparatus.

DETAILED DESCRIPTION OF THE INVENTION

The present invention will be described in detail below.

The first aspect of the present invention is a dispersible composition that comprises a polymer compound having a monomer unit structure represented by the general formula (1), a functional substance and a solvent or dispersion medium.

General Formula (1)

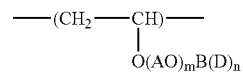

wherein A is a straight-chain or branched alkylene group of 1 to 15 carbon atoms with or without substitution; m is an integer of 0 to 30, and when m is 2 or more, A is the same or different each other; B is a single bond or an alkylene with or without substitution; D is a substituted or unsubstituted aromatic ring structure; n is an integer of 1 to 10, and when n is 2 or more, D is the same or different with each other.

Preferably, the polymer compound has a monomer unit structure represented by the general formula (1) wherein A is a straight-chain or branched alkylene group of 1 to 10 carbon atoms with or without substitution; m is an integer of 0 to 10, and when m is 2 or more, A is the same or different each other; B is a single bond or an alkylene with or without substitution; D is an aromatic ring unsubstituted or substituted with alkyl or alkoxy; n is an integer of 1 to 5, and when n is 2 or more, D is the same or different with each other.

Concrete examples of these monomer units are shown below.

—(CH$_2$—CH)—
         |
         OCH$_2$CH$_2$OPh

—(CH$_2$—CH)—
         |
         OCH$_2$CH$_2$OPhCH$_3$

—(CH$_2$—CH)—
         |
         OCH$_2$CH$_2$PhOCH$_3$

—(CH$_2$—CH)—
         |
         OCH$_2$CH$_2$PhOC$_2$H$_5$

—(CH$_2$—CH)—
         |
         OCH$_2$CH$_2$OPhPh

—(CH$_2$—CH)—
         |
         OCH$_2$CH$_2$OPhOCH$_3$

—(CH$_2$—CH)—
         |
         OCH$_2$CH$_2$ONp

—(CH$_2$—CH)—
         |
         OCH$_2$CH$_2$CH$_2$OPhOC$_2$H$_5$

—(CH$_2$—CH)—
         |
         OCH$_2$CH$_2$CH$_2$OPhCH$_3$

—(CH$_2$—CH)—
         |
         OCH$_2$CH(CH$_3$)OPhOC$_2$H$_5$

—(CH$_2$—CH)—
         |
         OCH$_2$CH(C$_2$H$_5$)OPhOC$_2$H$_5$

—(CH$_2$—CH)—
         |
         OCH$_2$CH(C$_3$H$_7$)OPhOC$_2$H$_5$

—(CH$_2$—CH)—
         |
         O(CH$_2$CH$_2$O)$_2$PhOC$_3$H$_7$

—(CH$_2$—CH)—
         |
         O(CH$_2$CH$_2$O)$_2$PhPhCH$_3$

—(CH$_2$—CH)—
         |
         O(CH$_2$CH$_2$O)$_2$PhPh

—(CH$_2$—CH)—
         |
         O(CH$_2$CH$_2$O)$_3$PhPh

—(CH$_2$—CH)—
         |
         O(CH$_2$CH$_2$O)$_2$Np—Ph

—(CH$_2$—CH)—
         |
         O(CH$_2$CH$_2$O)$_3$NpOC$_2$H$_5$

—(CH$_2$—CH)—
         |
         O(CH$_2$CH$_2$O)$_3$NpCOC$_2$H$_5$

—(CH$_2$—CH)—
         |
         OCH$_2$CH$_2$O(CH$_2$)$_2$PhOCH$_3$

—(CH$_2$—CH)—
         |
         OCH$_2$CH$_2$O(CH$_2$)$_3$PhPhOCH$_3$

—(CH$_2$—CH)—
         |
         OCH$_2$CH$_2$O(CH$_2$)$_4$PhPhCH$_3$

—(CH$_2$—CH)—
         |
         OCH$_2$CH$_2$O(CH$_2$)$_5$NpCH$_3$

—(CH$_2$—CH)—
         |
         O(CH$_2$CH$_2$O)$_6$PhOCH$_3$

—(CH$_2$—CH)—
         |
         O(CH$_2$CH$_2$O)$_7$PhPhOCH$_3$

—(CH$_2$—CH)—
         |
         OCH$_2$CH$_2$O(CH$_2$CH$_2$CH$_2$O)$_2$PhOCH$_3$

—(CH$_2$—CH)—
         |
         OCH$_2$CH$_2$OPyPhOCH$_3$

—(CH$_2$—CH)—
         |
         OCH$_2$CH$_2$OPyPh

—(CH$_2$—CH)—
         |
         OCH$_2$CH$_2$O(CH$_2$)$_{20}$PhPhPh

—(CH$_2$—CH)—
         |
         O(CH$_2$CH$_2$O)$_2$(CH$_2$)$_2$PhPh

—(CH$_2$—CH)—
         |
         O(CH$_2$CH$_2$O)$_3$(CH$_2$)$_3$PhPhPh

-continued

—(CH$_2$—CH)—
         |
         O(CH$_2$CH$_2$O)$_{10}$PhPhPh

—(CH$_2$—CH)—
         |
         O(CH$_2$CH$_2$O)$_{20}$PhPhPh

—(CH$_2$—CH)—
         |
         O(CH$_2$CH$_2$O)$_2$(CH$_2$)$_6$OPhPhPhOC$_2$H$_5$

—(CH$_2$—CH)—
         |
         O(CH$_2$CH$_2$O)$_5$(CH$_2$)$_7$OPhPh

—(CH$_2$—CH)—
         |
         O(CH$_2$CH$_2$O)$_6$(CH$_2$)$_8$OPhPh

—(CH$_2$—CH)—
         |
         O(CH$_2$CH$_2$O)$_{10}$(CH$_2$)$_{10}$OPhPh

—(CH$_2$—CH)—
         |
         O(CH$_2$CH$_2$O)$_{15}$(CH$_2$)$_{15}$OPhPh

—(CH$_2$—CH)—
         |
         O(CH$_2$CH$_2$O)$_2$(CH$_2$)$_{20}$OPhPh

—(CH$_2$—CH)—
         |
         OCH$_2$CH$_2$CH$_2$CH$_2$CH$_2$CH$_2$O(CH$_2$)$_2$OPhPhPh

—(CH$_2$—CH)—
         |
         OCH$_2$CH$_2$CH$_2$CH$_2$O(CH$_2$)$_3$OPhPhPh

—(CH$_2$—CH)—
         |
         OCH$_2$CH$_2$CH$_2$CH$_2$O(CH$_2$)$_4$OPhPh

—(CH$_2$—CH)—
         |
         OCH$_2$CH$_2$CH$_2$CH$_2$CH$_2$CH$_2$CH$_2$CH$_2$O(CH$_2$)$_5$OPhPhPhOC$_2$H$_5$

—(CH$_2$—CH)—
         |
         OCH$_2$CH$_2$CH$_2$CH$_2$CH$_2$CH$_2$O(CH$_2$)$_6$OPhPhC$_2$H$_5$

—(CH$_2$—CH)—
         |
         OCH(CH$_3$)CH$_2$O(CH$_2$)$_7$OPhPh

—(CH$_2$—CH)—
         |
         OCH(CH$_3$)CH$_2$O(CH$_2$)$_8$OPhPh

—(CH$_2$—CH)—
         |
         OCH$_2$CH(CH$_3$)O(CH$_2$)$_{10}$OPhPhOC$_2$H$_5$

—(CH$_2$—CH)—
         |
         OCH(C$_2$H$_5$)CH$_2$O(CH$_2$)$_{15}$OPhPhOC$_2$H$_5$

—(CH$_2$—CH)—
         |
         OCH$_2$CH(CH$_3$)O(CH$_2$)$_{20}$OPhPhPhOC$_2$H$_5$

—(CH$_2$—CH)—
         |
         OCH$_2$CH$_2$O(CH$_2$)$_2$OPhPh

—(CH$_2$—CH)—
         |
         OCH$_2$CH$_2$O(CH$_2$)$_3$OPhPh

—(CH$_2$—CH)—
         |
         OCH$_2$CH$_2$O(CH$_2$)$_4$OPhPyr

—(CH$_2$—CH)—
         |
         OCH$_2$CH$_2$CH$_2$CH$_2$O(CH$_2$)$_5$OPyrPh

—(CH$_2$—CH)—
         |
         OCH$_2$CH$_2$O(CH$_2$)$_6$OPhPh(OCH$_3$)$_2$

—(CH$_2$—CH)—
         |
         O(CH$_2$CH$_2$O)$_2$(CH$_2$)$_7$OPhPh(OCH$_3$)$_3$

—(CH$_2$—CH)—
         |
         OCH$_2$CH$_2$O(CH$_2$)$_8$OPhPhOCH$_3$

-continued

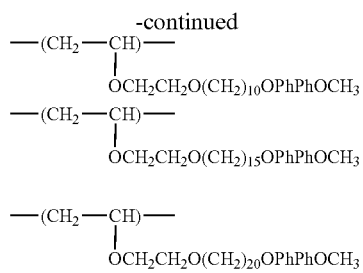

(Ph represents phenyl, Pyr represents pyridyl, and Np represents naphthyl).

The polymer compound to be used in the present invention is preferably amphipathic, that is, it has medium-philic monomer units and medium-phobic monomer units, more preferably, hydrophilic and hydrophobic respectively.

Further, the polymer compound is preferably a block polymer, and the monomer unit structure represented by the general formula (1) is included in a hydrophobic block segment. Block polymers preferably used in the present invention have plural, different block segments, for example, they may be AB, ABC, ABA or ABCD type.

In addition to the monomer units represented by the general formula (1), monomer units of the following general formula (2) may be contained in the polymer compound to be used in the present invention:

General Formula (2)

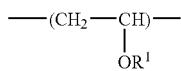

wherein $R^1$ is selected from the group consisting of a straight, branched or cyclic alkyl group of 1 to 18 carbon atoms, Ph, Pyr, Ph—Ph, Ph-Pyr, —(CH($R^5$)—CH($R^6$)—O)$_p$—$R^7$ and —(CH$_2$)m-(O)$_n$—$R^7$, where the aromatic ring may be substituted with a straight or branched alkyl group of 1 to 4 carbon atoms, and carbon atom in the aromatic ring may be replaced by nitrogen atom;

p is an integer of 1 to 18, m is an integer of 1 to 36, and n is 0 or 1;

$R^5$ and $R^6$ are each independently a hydrogen atom or CH$_3$;

$R^7$ is selected from the group consisting of hydrogen atom, a straight, branched or cyclic alkyl group of 1 to 18 carbon atoms, Ph, Pyr, Ph-Ph, Ph-Pyr, —CHO, —CO—CH═CH$_2$, —CO—C(CH$_3$)═CH$_2$ and —CH$_2$COOR$^8$, and when $R^7$ is other than hydrogen atom, the hydrogen atom bound to the carbon atom may be replaced by a straight-chain or branched alkyl group of 1 to 4 carbon atoms, or F, Cl or Br, and the carbon atom in the aromatic ring may be replaced by nitrogen atom;

$R^8$ is hydrogen atom, or an alkyl group of 1 to 5 carbon atoms; and

Ph is phenyl group, and Pyr is pyridyl group.

More specifically, these monomer units include:

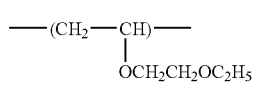

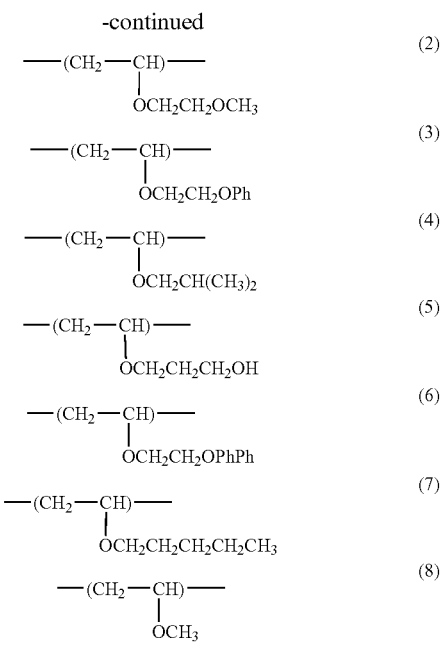

Among the monomer units (1) to (8) shown above, (3) and (4) are hydrophobic, and (1), (2) and (5) change hydrophobic to hydrophilic and vice versa, depending on the conditions.

As described above, the polymer compounds of general formula (1) to be used in the present invention have aromatic ring(s), so that they can absorb outer light, especially, UV or near UV light which may degrade the functional substances, exerting protection functions. Thus, use of such a polymer compound may improve weather resistance. In addition, since the monomer units of general formulas (1) and (2) form highly flexible polyvinyl main chain, the polymer compounds have an advantage of higher affinity to the functional substances.

The content of the monomer unit represented by the general formula (1) in the polymer compound of the present invention is 0.001 to 99.9% by mole of the whole polymer compound, preferably 1 to 99 mol %. Its content outside the above range is not desirable; it may have an insufficient interaction on the polymer compound when present at below 0.001%, and may exhibit its function as a block polymer insufficiently when present at above 99.9% because of the excessive interaction. The monomer unit other than that represented by the general formula (1) is incorporated at 0.5 to 99.99% by mole of the whole polymer compound, preferably 5 to 99%.

The polymer compound comprising monomer units represented by the general formula (1) has a number-average molecular weight (Mn) of 200 to 10,000,000, preferably 1000 to 1,000,000. The compound having a molecular weight above 10,000,000 may not be readily dispersed in a solvent, because of excessive entanglement within or between the polymer chains. On the other hand, those having a molecular weight below 200 may be difficult to fully exhibit the steric effect as a polymer compound, because of excessively low molecular weight.

Further, each block segment of the block polymer preferably used in the present invention may be made of the same monomer units or of different ones. Examples of block polymers made of different monomer units are random copolymers and gradient copolymers in which the composition ratio changes gradually. The block polymer to be used in the present invention may also be a graft copolymer.

The block polymer compound containing a monomer unit represented by the general formula (1) has a number-average molecular weight (Mn) of 200 to 10,000,000, preferably 1000 to 1,000,000. The compound having a molecular weight above 10,000,000 may not be readily dispersed in a solvent, because of excessive entanglement within or between the polymer chains. On the other hand, those having a molecular weight below 200 may be difficult to fully exhibit the steric effect as a polymer compound, because of excessively low molecular weight. Preferable polymerization degree of each segment is 3 or more but not higher than 10000, more preferably, 5 or more but not higher than 5000.

When the block polymer compound of the present invention is amphipathic, it can form micelles in an aqueous solvent. In such a case, the amphipathic polymer compound has desirable properties for recording materials, which is discussed later.

The polymer compound comprising monomer units represented by the general formula (1) can be obtained by cationic polymerization. As a polymerization initiator, protonic acids such as hydrochloric, sulfuric, methanesulfonic, trifluoroacetic, trifluoromethanesulfonic and perchloric acid; Lewis acids such as $BF_3$, $AlCl_3$, $TiCl_4$, $SnCl_4$, $FeCl_3$, $RAlCl_2$ or $R_{1.5}AlCl_{1.5}$, where R is an alkyl, in combination with a cation source such as protonic acid, water, alcohol or adduct of vinyl ether and carboxylic acid. The polymer compound can be produced by polymerization of a vinyl ether compound in the presence of such a polymerization initiator.

Next, the polymerization process more suitably used for the present invention is described. A number of processes have been proposed for production of polymers comprised of polyvinyl ether monomer units (e.g., Japanese Patent Application Laid-Open No. 11-080211). Representative one is cation living polymerization proposed by Aoshima et al (Japanese Patent Applications Laid-Open No. 11-322942 and No. 11-322866). Cation living polymerization can produce various polymers with a precise length (molecular weight), and these polymers include homopolymers, copolymers comprised of plural monomer components, block polymers, graft polymers and gradient polymers. Alternatively, living polymerization process can be carried out using $HI/I_2$ or $HCl/SnCl_4$.

One preferable embodiment of the composition of the present invention is a composition encapsulating the functional substance in the polymer compound and the functional substance is a colorant. When encapsulated, the functional substance is protected from the outer environment, and becomes more stable. In view of readiness of encapsulation, an amphipathic block copolymer is preferably used in the present invention. Usually an amphipathic polymer forms micelles in an aqueous medium and can contain a hydrophobic functional substance in the hydrophobic core with ease. For example, when a colorant being not water-soluble but soluble in non-aqueous organic solvents is dissolved in such an organic solvent, and then the solution is put into a dispersion containing the micelles of the block polymer in water, and dispersed with a disperser, fine particles of the organic solvent in which the functional substance is dissolved are included in the hydrophobic cores of the micelles.

The composition of the present invention contains the polymer compound at a content of 0.2 to 99% by weight of the total weight of the composition, preferably 0.5 to 70 wt %. When the content is less than 0.2 wt %, the dispersion of the functional substance may be insufficient, and if higher than 99 wt %, the viscosity may be too high.

The composition of the present invention comprises the polymer compound and a functional substance having an intended function. The functional substance can be liquid or solid including a soluble material. For example it may be oil, pigment, metal, herbicide, insecticide, biomaterial, medicine, dye and molecular catalyst. Preferable example of a functional substance is a colorant. The content of the functional substance in the composition is 0.1 to 80% by weight, preferably 0.5 to 60% by weight. When the content is less than 0.1% by weight, function may not exert, and the content more than 80% by weight may cause insufficient dispersion.

The dispersible composition of the invention contains a solvent or dispersion medium, and the dispersion medium may be a binder resin. The solvent or dispersion medium may be water, aqueous solvents, non-aqueous organic solvents, or mixture thereof. The aqueous solvents includes polyhydric alcohols such as ethylene glycol, diethylene glycol, triethylene glycol, polyethylene glycol, propylene glycol, polypropylene glycol and glycerin; polyhydric alcohol ethers such as ethylene glycol monomethyl ether, ethylene glycol monoethyl ether, ethylene glycol monobutyl ether, diethylene glycol monoethyl ether and diethylene glycol monobutyl ether; and nitrogen-containing solvents such as N-methyl pyrrolidone, substituted pyrrolidone and triethanolamine. Monohydric alcohol such as methanol, ethanol and isopropyl alcohol may also be used. The non-aqueous organic solvents include hydrocarbon solvent such as hexane, heptane, octane, decane, toluene, cyclohexanone, acetone, methylethylketone and butyl acetate; natural oil such as olive oil, soy oil, lard and beef tallow. The binder resin includes styrene-acryl copolymer and polyester The content of solvent or dispersion medium in the dispersible composition of the present invention is 1 to 99% by weight, more preferably, 10 to 95% by weight. When the content is not in this range, dispersion of the functional substance may be insufficient.

Further, preferable embodiments of the invention are a toner composition that comprises a dispersion medium, a colorant and a polymer made of a monomer unit represented by the general formula (1), and an ink composition that comprises a solvent, a colorant and a polymer made of a monomer unit represented by the general formula (1)

First, the ink composition being one of the preferred embodiments of the present invention is described.

The content of the polymer compound comprising monomer units represented by the general formula (1) or (2) is 0.1 to 90% by weight, preferably 1 to 80%, of the ink composition. The content is preferably 1 to 30% by weight, when used for ink-jet printing.

Components of the ink composition other than the polymer compound are described in detail below. They are water, aqueous solvent, colorant and additives.

[Water]

Water is preferably ion-exchanged water, pure water or superpure water from which metal ions etc. have been removed.

[Aqueous Solvent]

The aqueous solvent useful for the present invention includes polyhydric alcohols such as ethylene glycol, diethylene glycol, triethylene glycol, polyethylene glycol, propylene glycol, polypropylene glycol and glycerin; polyhydric alcohol ethers such as ethylene glycol monomethyl ether, ethylene glycol monoethyl ether, ethylene glycol monobutyl ether, diethylene glycol monoethyl ether and diethylene glycol monobutyl ether; and nitrogen-containing solvents such as N-methylpyrrolidone, substituted pyrrolidone and triethanolamine. Monohydric alcohol such as methanol, ethanol and isopropyl alcohol can be used to accelerate drying of the ink on the recording medium.

Water and aqueous solvent are incorporated preferably at 20 to 95%, more preferably 30 to 90%, by weight of the ink composition of the present invention. Organic solvent such as toluene, ethyl acetate, acetone or methylethylketone may be incorporated in place of water and aqueous solvent.

[Colorant]

The ink composition of the present invention also contains a colorant such as pigment and dye, preferably pigment. Specific examples of pigment and dye useful for the present invention are described below.

Pigment can be either organic or inorganic. Pigments preferably used for ink are pigments of black and three primary colors of cyan, magenta and yellow. Also, other pigments, e.g., pigments of other colors, colorless or pale colored pigments, pigments of metal luster may be used. New pigments synthesized for the present invention may be also used.

Followings are examples of commercially available pigments of black, cyan, magenta, and yellow.

Examples of black pigments include, but not limited to, Raven 1060, Raven 1080, Raven 1170, Raven 1200, Raven 1250, Raven 1255, Raven 1500, Raven 2000, Raven 3500, Raven 5250, Raven 5750, Raven 7000, Raven 5000 ULTRA II, Raven 1190 ULTRA II (all of the above, manufactured by Columbian Carbon Co.), Black Pearls L, MOGUL-L, Regal 400R, Regal 660R, Regal 330R, Monarch 800, Monarch 880, Monarch 900, Monarch 1000, Monarch 1300, Monarch 1400 (all of the above, manufactured by CABOT CORPORATION), Color Black FW1, Color Black FW2, Color Black FW200, Color Black 18, Color Black S160, Color Black S170, Special Black 4, Special Black 4A, Special Black 6, Printex 35, Printex U, Printex 140U, Printex V, Printex 140V (all of the above, manufactured by Degussa AG), No.25, No.33, No.40, No.47, No.52, No.900, No.2300, MCF-88, MA600, MA7, MA8, MA100 (all of the above, manufactured by MITSUBISHI CHEMICAL CORPORATION).

Examples of cyan pigments include, but not limited to, C.I. Pigment Blue-1, C.I. Pigment Blue-2, C.I. Pigment Blue-3, C.I. Pigment Blue-15, C.I. Pigment Blue-15:2, C.I. Pigment Blue-15:3, C.I. Pigment Blue-15:4, C.I. Pigment Blue-16, C.I. Pigment Blue-22, C.I. Pigment Blue-60.

Examples of magenta pigments include, but not limited to, C.I. Pigment Red-5, C.I. Pigment Red-7, C.I. Pigment Red-12, C.I. Pigment Red-48, C.I. Pigment Red-48:1, C.I. Pigment Red-57, C.I. Pigment Red-112, C.I. Pigment Red-122, C.I. Pigment Red-123, C.I. Pigment Red-146, C.I. Pigment Red-168, C.I. Pigment Red-184, C.I. Pigment Red-202, C.I. Pigment Red-207.

Examples of yellow-pigments include, but not limited to, C.I. Pigment Yellow-12, C.I. Pigment Yellow-13, C.I. Pigment Yellow-14, C.I. Pigment Yellow-16, C.I. Pigment Yellow-17, C.I. Pigment Yellow-74, C.I. Pigment Yellow-83, C.I. Pigment Yellow-93, C.I. Pigment Yellow-95, C.I. Pigment Yellow-97, C.I. Pigment Yellow-98, C.I. Pigment Yellow-114, C.I. Pigment Yellow-128, C.I. Pigment Yellow-129, C.I. Pigment Yellow-151, C.I. Pigment Yellow-154.

The composition of the present invention may also contain a self-dispersing pigment dispersible in water. Such pigments fall into two types, those covered with adsorbed polymer for steric hindrance effect, and those utilizing electrostatic repulsion effect. The commercial products include CAB-O-JET200 and CAB-O-JET300 (Cabot Corporation), and Microjet Black CW-1 (Orient Chemical Industries).

The pigment for the ink composition of the present invention is incorporated preferably at 0.1 to 50% by weight of the ink composition. Content lower than 0.1% may not give a sufficient image concentration, and content higher than 50% may deteriorate fixation properties of the image. More preferable content is 0.5 to 30% by weight.

Also dye can be used for the ink composition of the present invention. Dyes useful for the present invention include direct, acidic, basic and reactive dyes, water-soluble dyes for food coloring and insoluble dispersion dyes.

For example, water-soluble dyes may be direct dyes such as C.I. Direct Black-17, -19, -22, -32, -38, -51, -62, -71, -108, -146, -154; C.I. Direct Yellow-12, -24, -26, -44, -86, -87, -98, -100, -130, -142; C.I. Direct Red, -1, -4, -13, -17, -23, -28, -31, -62, -79, -81, -83, -89, -227, -240, -242, -243; C.I. Direct Blue-6, -22, -25, -71, -78, -86, -90, -106, -199; C.I. Direct Orange-34, -39, -44, -46, -60; C.I. Direct Violet-47, -48; C.I. Direct Brown-109; C.I. Direct Green-59, acid dyes such as C.I. Acid Black-2, -7, -24, -26, -31, -52, -63, -112, -118, -168, -172, -208; C.I. Acid Yellow-11, -17, -23, -25, -29, -42, -49, -61, -71; C.I. Acid Red-1, -6, -8, -32, -37, -51, -52, -80, -85, -87, -92, -94, -115, -180, -254, -256, -289, -315, -317; C.I. Acid Blue-9, -22, -40, -59, -93, -102, -104, -113, -117, -120, -167, -229, -234, -254: C.I. Acid Orange-7, -19; C.I. Acid Violet-49, reactive dyes such as C.I. Reactive Black-1, -5, -8, -13, -14, -23, -31, -34, -39; C.I. Reactive Yellow-2, -3, -13, -15, -17, -18, -23, -24, -37, -42, -57, -58, -64, -75, -76, -77, -79, -81, -84, -85, -87, -88, -91, -92, -93, -95, -102, -111, -115, -116, -130, -131, -132, -133, -135, -137, -139, -140, -142, -143, -144, -145, -146, -147, -148, -151, -162, -163; C.I. Reactive Red-3, -13, -16, -21, -22, -23, -24, -29, -31, -33, -35, -45, -49, -55, -63, -85, -106, -109, -111, -112, -113, -114, -118, -126, -128, -130, -131, -141, -151, -170, -171, -174, -176, -177, -183, -184, -186, -187, -188, -190, -193, -194, -195, -196, -200, -201, -202, -204, -206, -218, -221; C.I. Reactive Blue-2, -3, -5, -8, -10, -13, -14, -15, -18, -19, -21, -25, -27, -28, -38, -39, -40, -41, -49, -52, -63, -71, -72, -74, -75, -77, -78, -79, -89, -100, -101, -104, -105, -119, -122, -147, -158, -160, -162, -166, -169, -170, -171, -172, -173, -174, -176, -179, -184, -190, -191, -194, -195, -198, -204, -211, -216, -217; C.I. Reactive Orange-5, -7, -11, -12, -13, -15, -16, -35, -45, -46, -56, -62, -70, -72, -74, -82, -84, -87, -91, -92, -93, -95, -97, -99; C.I. Reactive Violet-1, -4, -5, -6, -22, -24, -33, -36, -38;

C.I. Reactive Green-5, -8, -12, -15, -19, -23; C.I. Reactive Brown-2, -7, -8, -9, -11, -16, -17, -18, -21, -24, -26, -31, -32, -33, C.I. Basic Black-2; C.I. Basic Red-1, -2, -9, -12, -13, -14, -27; C.I. Basic Blue-1, -3, -5, -7, -9, -24, -25, -26, -28, -29; C.I. Basic Violet-7, -14, -27; C.I. Food Black-1, -2.

The above-described colorant examples are preferable for the ink composition of the present invention. However, the useful ones for the present invention are not limited to the above. The content of a dye in the ink composition of the present invention is preferably 0.1 to 50% by weight of the ink.

[Additives]

The composition of the present invention may contain various additives or auxiliary agents as required. One of the additives useful for the present invention is a dispersion stabilizer, which stably disperses the pigment in the solvent. The composition of the present invention can disperse granular solid such as pigment due to the polyvinyl ether polymer contained therein. However, it may contain another dispersion stabilizer, when its dispersion capacity is insufficient.

As a dispersion stabilizer which can be added to the composition of the present invention, there are resins and surfactants having both hydrophilic and hydrophobic segments therein. Examples of such amphiphilic resins include a copolymer of hydrophilic and hydrophobic monomers.

Hydrophilic monomers useful for the present invention include acrylic, methacrylic, maleic and fumaric acid, the carboxylate monoesters described earlier, vinylsulfonic and styrenesulfonic acid, vinyl alcohol, acrylamide, and methacryloxyethyl phosphate or the like. Hydrophobic monomers useful for the present invention include styrene and its derivatives, e.g., styrene and $\alpha$-methylstyrene; and vinyl cyclohexane, vinylnaphthalene derivative, acrylate esters and methacrylate esters. Copolymers of various structures, such as random, block or graft copolymers may be used for the present invention. Needless to say, the hydrophilic and hydrophobic monomers useful for the present invention are not limited to the above.

The surfactant for the present invention may be anionic, nonionic, cationic or ampholytic. The anionic surfactants useful for the present invention include fatty acid salts, alkyl sulfate ester salts, alkylarylsulfonic acid satlts, alkyldiaryl ether disulfonic acid salts, dialkylsulfosuccinic acid salts, alkyl phosphoric acid salts, naphthalene/formalin sulfonate condensate, polyoxyethylene alkyl phosphate ester salts and glycerol borate fatty acid esters. The nonionic surfactants useful for the present invention include polyoxyethylene alkyl ether, polyoxyethyleneoxypropylene block copolymer, sorbitan/fatty acid ester, glycerin/fatty acid ester, polyoxyethylene/fatty acid ester, polyoxyethylenealkylamine, and fluorine- and silicon-based ones. The cationic surfactants useful for the present invention include alkylamine salts, quarternary ammonium salts, alkyl pirydinium salts and alkyl imidazolium salts. The ampholytic surfactants useful for the present invention include alkyl betaine and alkylamine oxide and phosphatidyl choline. The surfactants useful for the present invention are also not limited to the above.

Further, the ink composition of the invention may contain an aqueous solvent if necessary. When the ink composition is used as an ink jet ink, an aqueous solvent is added to prevent the ink from drying at the nozzle or from solidifying. The aqueous solvent can be used alone or with water. The aqueous solvents are already described above. The content of the solvent is 0.1 to 60% by weight, preferably 1 to 25% by weight of the ink composition.

The other additives to the ink composition of the present invention include a pH adjustor for stabilizing the ink and securing stability of the ink in a flow path of the recording apparatus, a penetration agent for accelerating penetration of the ink into the recording medium and thereby accelerating apparent drying of the ink, an antifungal agent to protect the ink from molds, a chelating agent for sequestering metal ions in the ink and preventing metal deposition in the nozzle or deposition of insolubles in the ink, an antifoaming agent for preventing foaming of the ink during circulation, migration or production of the ink, an antioxidant, a viscosity adjustor, an antistatic agent and a UV absorber.

The ink composition of the present invention can be produced by mixing and uniformly dissolving or dispersing the above components. For example, two or more components are mixed with each other, and pulverized and dispersed by using a sand mill, ball mill, homogenizer or nanomizer to prepare the ink base liquid, whose properties are adjusted with a solvent or additives.

Next, the toner composition of the present invention is described. More specifically, the toner composition comprises a dispersion medium such as a binder resin, a colorant and a polymer compound comprising monomer units represented by the general formula (1).

The polymer compound is incorporated at 0.1 to 50% by weight in the toner composition of the present invention, preferably 0.5 to 30%.

The polymer compound for the present invention can be used as the binder resin itself, or may be used in combination with a binder resin such as styrene acrylic resin and polyester resin.

The components other than the polymer compound for the toner composition of the present invention are described below in detail. These components include binder resins, colorants (pigment or dye), charge controlling agents, releasing agents, external additives and magnetic powder.

The binder resin useful for the toner composition includes styrene acrylic copolymer, polyester and polycarbonate. Binder resin content is preferably 10 to 99% by weight. As the colorant, the pigments and dyes described earlier for the ink composition can be also used. It is incorporated preferably at 0.1 to 50% by weight. The charge controlling agents useful for the present invention include metal/azo complexes, triphenylmethane-based dyes, nigrosine and ammonium salts. It is incorporated preferably at 0.1 to 30% by weight. The releasing agents useful for the present invention include synthetic wax and natural wax. The external additives useful for the present invention include finely pulverized inorganic materials, e.g., silica, alumina and titana; and finely pulverized resins, e.g., polyvinylidene fluoride (PVDF) and polytetrafluoroethylene. The magnetic powders useful for the present invention include those of magnetite, hematite and ferrite. The toner composition of the present invention can work if not all of these components are contained, and it may contain other components.

The toner composition of the present invention can be produced by mixing the above components, melting/kneading them to a uniform mixture, finely pulverizing the mixture by a speed mill or jet mill, and classifying the resulting particles to obtain toner particles of an intended size. The toner composition can be produced by mixing the resulting toner particles with an external additives by a mixer.

The second aspect of the present invention is an image-forming method using the above described composition, and a preferable embodiment is an image forming method by ink jet recording.

The third aspect of the present invention is an image-forming apparatus to be used for the above image-forming method.

[Image-Forming Method and Apparatus]

The ink composition of the present invention is applicable to a variety of image-forming methods, e.g., various printing methods, ink-jet method and electrophotography, and also to an apparatus with which it can form images based on the above methods.

The image-forming method of the present invention can produce good images by the aid of the composition of the present invention. One of the preferred embodiments of the image-forming method of the present invention is an ink jet method that discharges the ink composition of the present invention from an ink discharge nozzle onto a recording medium to form an image thereon. One of the preferred methods is an ink-jet method that utilizes thermal energy to discharge ink from the nozzle.

Various types of ink-jet printers can use the composition of the present invention. These include a piezo-electric ink-jet type with a piezo-electric apparatus, and thermal ink-jet type, which gives a thermal energy to the ink to be foamed.

An ink-jet recording apparatus is outlined by referring to FIGURE. It should be understood that the apparatus shown in FIGURE is for illustrating but not for limiting the present invention.

FIGURE is a block diagram illustrating the structure of an ink-jet recording apparatus.

The apparatus shown in FIGURE does recording on a recording medium moving the head. Referring to FIGURE, the motors 56 and 58 responsible for driving the head 70 in the X and Y directions, respectively, are linked to the CPU 50, which commands all actions in the apparatus, via the circuits 52 and 54 for driving each motor. The CPU 50 instructs the motors 56 and 58 via the circuits 52 and 54 to drive the head 70 in the X and y directions to a given position on the recording medium.

As shown in FIGURE, the head-driving circuit 60 is also linked to the head 70, in addition to the motors 56 and 58 for driving the head in the respective X and Y direction, to drive the head 70 for a given action, e.g., discharging the ink, following the instruction from the CPU 50. The CPU 50 receives information of the head 70 position from the X encoder 62 and Y encoder 64 responsible for detecting the head position, which are also linked to the CPU 50. A control program is inputted in the program memory 66. The CPU 50 drives the head 70, based on the control program and position information from the X encoder 62 and Y encoder 64, to a desired position on the recording medium, and instructs the head to discharge the ink at that position. The apparatus forms a desired image on the recording medium in the above manner. For the image-forming apparatus which can hold 2 or more types of inks for ink-jet, the above procedure is repeated necessary times with each ink to produce a given image on the recording medium.

The head 70 can be also moved after it has discharged the ink as required, to a position where a means (not shown) for removing surplus ink deposited on the head is provided, to be cleaned by proper wiping means. Specific cleaning means may be selected from the conventional means used for the above purpose.

On completion of the above image-forming procedure, the recorded medium is replaced by a new medium by a recording medium conveying mechanism, which is not shown.

The above embodiment can be modified or varied within scope of the present invention. For example, the head 70 is moved in the X and Y directions in the above embodiment. However, it may be designed to move only in X (or Y) direction with the recording medium moving in Y (or X) direction, to form image.

According to the present invention, an ink jet recording head provided with means (e.g., an electro-thermal converting element or a laser) for generating thermal energy to discharge the ink brings the excellent effect. Such a system can produce precision images. The image quality can be further improved when the ink composition of the present invention is used in thermal ink jet recording.

The representative structures of and working principles for the apparatus provided with a means for generating thermal energy, e.g., the one described above, are preferably based on the basic principles disclosed by, e.g., U.S. Pat. No. 4,723,129 and U.S. Pat. No. 4,740,796. These apparatuses are applicable either to the so-called on-demand or continuous type. The apparatus of the present invention is particularly effective when applied to the on-demand type, because the liquid is securely held, and at least one type of driving signal, which corresponds to the discharge information, is applied to the electro-thermal converting element positioned in the flow path to generate thermal energy and increase temperature rapidly enough to cause at least nuclear boiling. This thermal energy causes film boiling on the heater board in the head, on which bubbles are formed by the action of heat according to the signals in one-to-one response. The liquid is discharged from the discharge port by expansion/shrinkage of the foams, to form at least one droplet. The pulsed driving signal is more preferable, because it immediately causes expansion/shrinkage of the foams, achieving quicker response for discharging the liquid. The pulse driving signals described in U.S. Pat. Nos. 4,463,359 and 4,345,262 are preferable. More excellent discharge can be done under the conditions concerning temperature increasing rate on the-heater described in U.S. Pat. No. 4,313,124.

In addition to the head structure described in above patent documents comprising a discharge orifice, an electro-thermal converting element, and a flow path that is straight or right angle, another structure disclosed in U.S. Pat. No. 4,459,600 or U.S. Pat. No. 4,558,333 is also included in the present invention where the heater is provided in a curved region. All of these structures are within scope of the present invention. Moreover, Japanese Patent Application Laid-Open No. 59-123670 discloses a structure with two or more electro-thermal converters and a common slit working as the discharge port for these converters. Japanese Patent Application Laid-Open No. 59-138461 discloses a structure provided with an opening for absorbing pressure waves caused by the thermal energy as the discharge port. These structures are also useful for the present invention. In short, the present invention can discharge the ink securely and efficiently by the head of any structure.

The image-forming apparatus of the present invention can also efficiently work, when provided with a full-line type head, which covers the maximum width of the recording medium. The head structure is not limited. For example, the maximum width can be covered by a combination of 2 or more heads, or by a single head.

Moreover, the apparatus of the present invention can also efficiently work, when provided with a serial type head, a head fixed on the apparatus body, or a chip type head that is exchangeably mounted on the apparatus body and electrically linked to and supplied with the ink from the apparatus body.

The apparatus of the present invention may be further provided with a means for removing liquid droplets. Such an apparatus can realize still more favorable discharging effect.

The apparatus of the present invention may have a structure provided with an auxiliary means. Such a structure is preferable, because it can further stabilize the effect of the present invention. The specific examples of these auxiliary means include a capping means for the head, pressurizing or evacuating means, preheating means of another electro-thermal converting element, a different heating element, or a combination thereof, and a preliminarily discharging means other than the ink discharging means.

The apparatus most effective for the present invention is that utilizing film boiling as described above.

Each port for the head of the present invention preferably discharges 0.1 to 100 picoliters of the ink.

The ink composition of the present invention can be also used for an indirect recording system in which an intermediate transfer medium is printed with the ink and the image is then transferred to a recording medium, e.g., paper. It is also applicable to a recording system which includes an intermediate transfer medium for direct printing.

The fourth aspect of the present invention is a block polymer having monomer units represented by the general formula (1) and also having carboxylic acid, carboxylic acid ester, carboxylic acid or carboxylic acid salt residue in its structure. Such a block polymer is preferably used for the composition of the first aspect of the present invention. The block polymer may contain the carboxylic acid (ester/salt) at any site of the polymer, i.e., on the monomer units or at the end of the polymer that may be the initiation or completion terminus of polymerization. Having carboxylic acid/ester/salt in the structure, the polymer can achieve intermolecular- and intramolecular interaction effectively, which enables, for example, more uniform micelle formation due to self-assembling of amphipathic block polymer molecules. This point is important for the present invention. For such interactions, it is preferable for the block polymer to have free carboxylic acid residue or salt thereof. Free carboxylic acid or salt thereof is often obtained by hydrolysis of carboxylic acid ester. Accordingly, the carboxylic acid ester residues in the structure is also very useful as a precursor of free carboxylic acid or salt thereof, although they may serve for inter- or intra-molecular interactions not much.

The present invention is described in more detail by EXAMPLES, which by no means limit the present invention.

EXAMPLE 1

<Polymer Synthesis>
Synthesis of AB Block Polymer (A block: Random Copolymer Segment of Isobutyl Vinyl Ether (IBVE) and

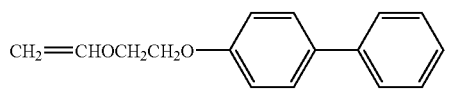

B Block: 2-methoxyethylvinylether Monomer Unit)

A glass container equipped with a stop cock was purged with nitrogen, and heated at 250° C. to remove adsorbed water. The container was cooled to room temperature, and charged with 6 mmols of IBVE, 6 mmols of

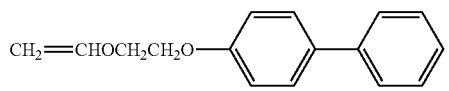

16 mmols of ethyl acetate, 0.1 mmols of 1-isobutoxyethyl acetate and 11 mL of toluene. The reaction was cooled, to which 0.2 mmols of ethyl aluminum sesqui-chloride (equimolar mixture of diethyl aluminum chloride and ethyl aluminum dichloride) was added at 0° C. to initiate the polymerization of the A block. Molecular weight of the A block was monitored periodically by gel permeation column chromatography (GPC) to determine completion of the polymerization.

Then 24 mmols of 2-methoxyethylvinylether (monomer for B block) was added to the reaction, and the polymerization was continued with periodical monitoring of molecular weight of the component B by gel permeation column chromatography (GPC) to determine completion of the polymerization, and then stopped by adding an aqueous solution of 0.3% by weight of ammonia/methanol. The reaction mixture was diluted with dichloromethane, and washed three times with 0.6 M hydrochloric acid and then 3 times with distilled water. The resulting organic phase was concentrated to dryness on an evaporator, dried under a vacuum to prepare the target diblock polymer. The compound was identified by NMR and GPC. It had an Mn value of 24,600 and Mw/Mn ratio of 1.24.

Then two parts of the diblock polymer dissolved in five parts of THF and co-dissolved with 1 part of an oil-soluble dye (Oil Blue N, Aldrich) dissolved in 3 parts of THF, and the solution was turned into an aqueous phase with 80 parts of an aqueous solution of 0.02 N sodium hydroxide, all parts by weight, and THF was removed by evaporation to prepare an ink composition (1). Oil Blue itself does not disperse in an aqueous solution without polymer. When a block polymer micelle dispersion was prepared without Oil Blue and a methylene chloride solution of Oil Blue was added thereto, uniform dispersion was observed showing that Oil Blue was incorporated into micelles.

EXAMPLE 2

Ink-jet printing test was carried out using the ink composition prepared in Example 1, where a normal paper was printed with the ink composition prepared in Example 1 using an ink jet printer (Bubble Jet Printer BJF800; manufactured by Canon Inc.), whose ink tank was filled with the composition. Blue letters were printed.

EXAMPLE 3

A block polymer was synthesized in the same manner as in Example 1 except that the polymerization of the final stage was stopped by adding 30 mmol of $HO(CH_2)_5COOEt$. The reaction mixture was diluted with dichloromethane and then washed with 0.6 M HCl and then with distilled water for three time each. The organic phage was concentrated to dryness on an evaporator to obtain a block polymer of which end became $-O(CH_2)_5COOEt$.

The synthesized polymer was identified by GPC and NMR. The terminal residue, especially, was identified by DOSY (diffusion-ordered spectroscopy) NMR, identifying the terminal residue in the spectrum of the polymer. Mn was 25800, and Mw/Mn was 1.4 where Mn is number average molecular weight and Mw is weight average molecular weight.

This block polymer was hydrolyzed with alkali, neutralized with hydrochloric acid to obtain a block polymer having $-O(CH_2)_5COOH$ at the end. Further alkali treatment gave a block polymer having $-O(CH_2)_5COO^-Na^+$ at the end.

EXAMPLE 4

A block polymer was synthesized in the same manner as in Example 3 except that the block A segment was synthesized using

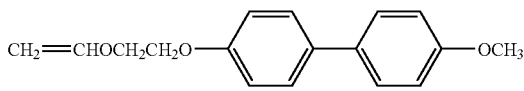

instead of

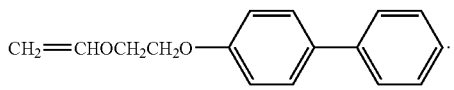

As a result, obtained polymer had Mn of 28800 and Mw/Mn of 1.4.

Next, the terminal modification was carried out in the same manner as in Example 3 to obtain block polymers having at the end thereof —O(CH$_2$)$_5$COOEt, —O(CH$_2$)$_5$COOH and O(CH$_2$)$_5$COO$^-$Na$^+$ respectively.

EXAMPLE 5

Using block polymers obtained in Examples 3 and 4, each having —O(CH$_2$)$_5$COO$^-$Na$^+$ at the end, ink compositions were prepared in the same manner as in Example 1. Ink jet recording was carried out using these ink compositions in the same manner as in Example 2, clear prints were obtained. These ink compositions were in a stable dispersion state at 100 hours after the preparation. The obtained printed matter was subjected to weathering test for three hours using a table top type weathering test apparatus (SUN TEST CPS+, a product of Toyo Seiki Seisaku-sho, LTD.). As a result, both prints retained optical density 99%.

EXAMPLE 6

The polymer having free carboxylic acid at the end prepared in Example 4 was used to prepare a toner composition by the following procedure.

100 parts of a polyester resin (synthesized from bisphenol A, terephthalic acid, n-dedecenylsuccinic acid, trimellitic acid and diethylene glycol in a molar ratio of 20:38:10:5:27), 70 parts of magnetite (Fe$_3$O$_4$), 3 parts of the free carboxylic acid polymer described above, 2 parts of triphenylmethane-based dye and 3 parts of a low-molecular weight polypropylene, all parts by weight, were preliminarily mixed, and then molten/kneaded by an extruder. The mixture was cooled, roughly divided by a speed mill, finely divided by a jet mill and classified by a zigzag classifier, to produce a toner having a volume-average diameter of 11 μm.

100 parts of the toner was mixed with 0.4 parts of positively chargeable, hydrophobic, dry type silica, treated with an amino-modified silicone oil (viscosity: 100 cp at 25° C. and amine equivalents: 800) and 0.2 parts of spherical PVDF particles (average particle diameter: 0.2 μm) by a Henschel mixer, all parts by weight, to prepare a positively chargeable toner composition. The toner composition gave a black print on a copier (NP-3525; manufactured by Canon Inc.).

COMPARATIVE EXAMPLE

Oil Blue, the oil-soluble dye used in Example 1, was dissolved in THF and applied onto a sheet of normal paper with a brush. The paper was subjected to the same weathering test as in Example 5. The optical density decreased to 88%, much deterioration in comparison with Example 5.

As explained above, the present invention provides a dispersible composition containing a specific polymer compound, which composition is suitably used to prepare ink compositions and toner composition with excellent dispersion of colorants or solid functional substances.

The present invention also provides recording materials of good dispersibility such as ink compositions and toner compositions, by formulating a specific polymer compound with a colorant and a solvent or dispersion medium.

The present invention also provides various image forming methods and image forming apparatuses using the recording material of the invention such as an ink composition or toner composition.

What is claimed is:

1. A dispersible composition comprising
a polymer compound,
a functional substance, and
an aqueous medium,
the polymer compound being an amphipathic block polymer compound including a hydrophobic block segment having a monomor unit represented by the general formula (1)

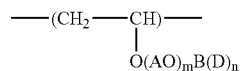

wherein
A is a straight-chain or branched alkylene group of 1 to 15 carbon atoms with or without substitution; m is an integer of 0 to 30, and when m is 2 or more, A is the same or different with each other;
B is a single bond or an alkylene with or without substitution;
D is an aromatic ring unsubstituted or substituted with alkyl or alkoxy;
n is an integer of 1 to 10, and
when n is 2 or more, D is the same or different with each other; and
wherein the amphipathic block polymer compound further includes a block segment represented by the general formula (2):

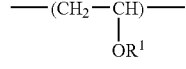

wherein R$^1$ is selected from the group consisting of a straight, branched or cyclic alkyl group of 1 to 18 carbon atoms, Ph, Pyr, Ph-Ph, Ph-Pyr, —(CH(R$^5$)—CH (R$^6$)—O)$_p$—R$^7$ and —(CH$_2$)$_m$—(O)$_n$—R$^7$, where the aromatic ring may be substituted with a straight or branched alkyl group of 1 to 4 carbon atoms, and carbon atom in the aromatic ring may be replaced by nitrogen atom;
P is an integer of 1 to 18, m is an integer of 1 to 36, and n is 0 or 1;
R$^5$ and R$^6$ are each independently a hydrogen atom or CH$_3$;
R$^7$ is selected from the group consisting of hydrogen atom, a straight, branched or cyclic alkyl group of 1 to 18 carbon atoms, Ph, Pyr, Ph-Ph, Ph-Pyr, —CHO,— CO—CH=CH$_2$, —CO—C(CH$_3$)=CH$_2$ and —$CH_2COOR^8$, and when $R^7$ is other than hydrogen atom, the hydrogen atom bound to the carbon atom may be replaced by a straight-chain or branched alkyl group of 1 to 4 carbon atoms, or F, Cl or Br, and the carbon atom in the aromatic ring may be replaced by nitrogen atom;

$R^8$ is hydrogen atom, or an alkyl group of 1 to 5 carbon atoms; and

Ph is phenyl group, and Pyr is pyridyl group wherein the functional substance is encapsulated in the polymer compound.

2. The composition according to claim 1, wherein the polymer compound further contains a residue selected from the group consisting of carboxylic acid ester, carboxylic acid and carboxylic acid salt.

3. The composition according to claim 1, wherein functional substance is a colorant.

4. A toner composition comprising a dispersible composition according to claim 1, wherein said functional substance is a colorant.

5. An ink composition comprising a dispersible composition according to claim 1, wherein said functional substance is a colorant.

6. The ink composition according to claim 5, wherein the polymer compound further comprises a residue selected from the group consisting carboxylic acids, carboxylic acid esters and carboxylic acid salts.

7. An image forming method comprising a step of applying a dispersible composition according to claim 1 onto a recording medium to form an image.

* * * * *